July 8, 1952  C. AUCKLAND  2,602,240
COMBINED HANDSAW AND GAUGE
Filed Jan. 28, 1949  2 SHEETS—SHEET 1
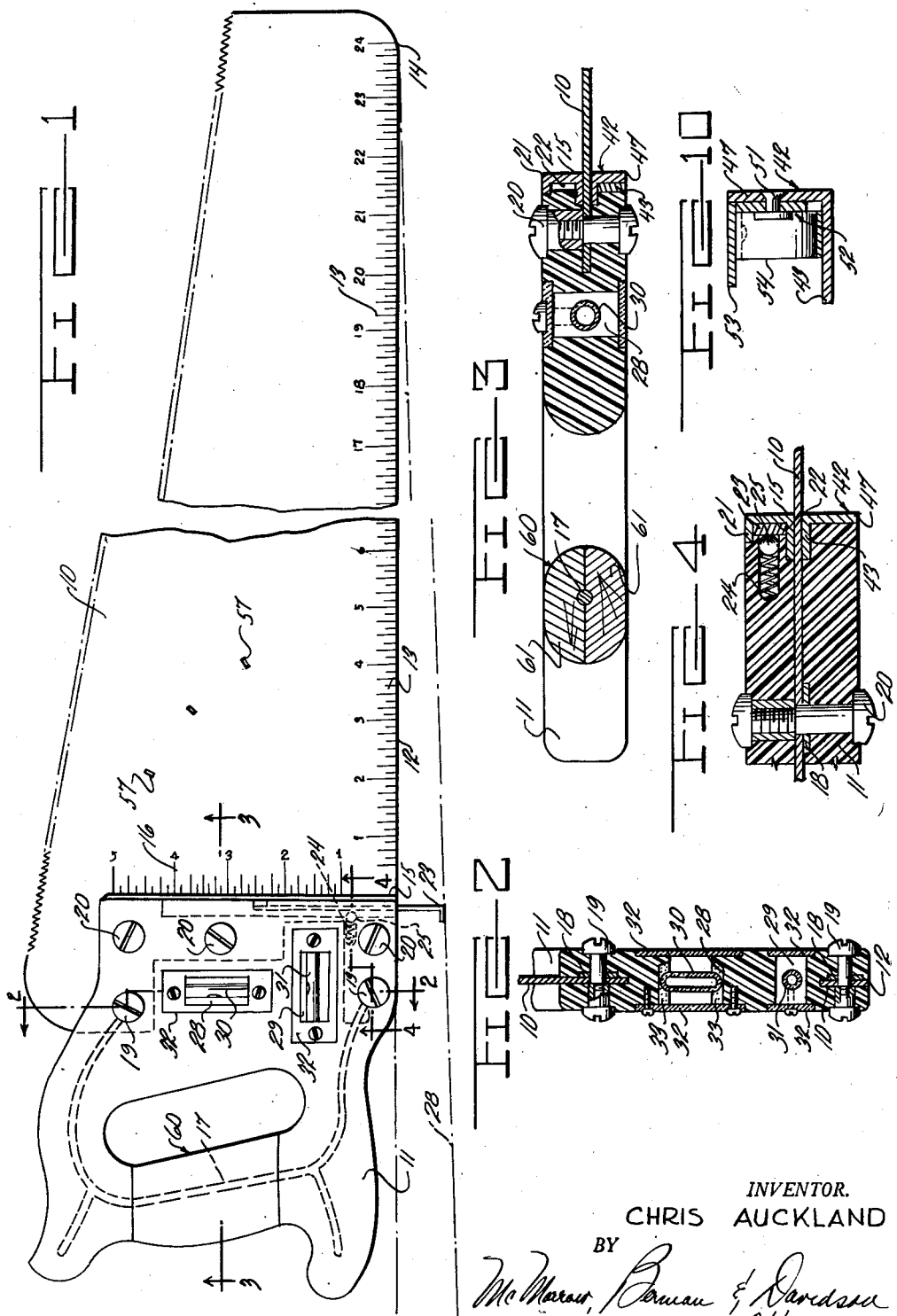
INVENTOR.
CHRIS AUCKLAND
BY
McMorrow, Berman & Davidson
Attorneys July 8, 1952 — C. AUCKLAND — 2,602,240
COMBINED HANDSAW AND GAUGE
Filed Jan. 28, 1949 — 2 SHEETS—SHEET 2
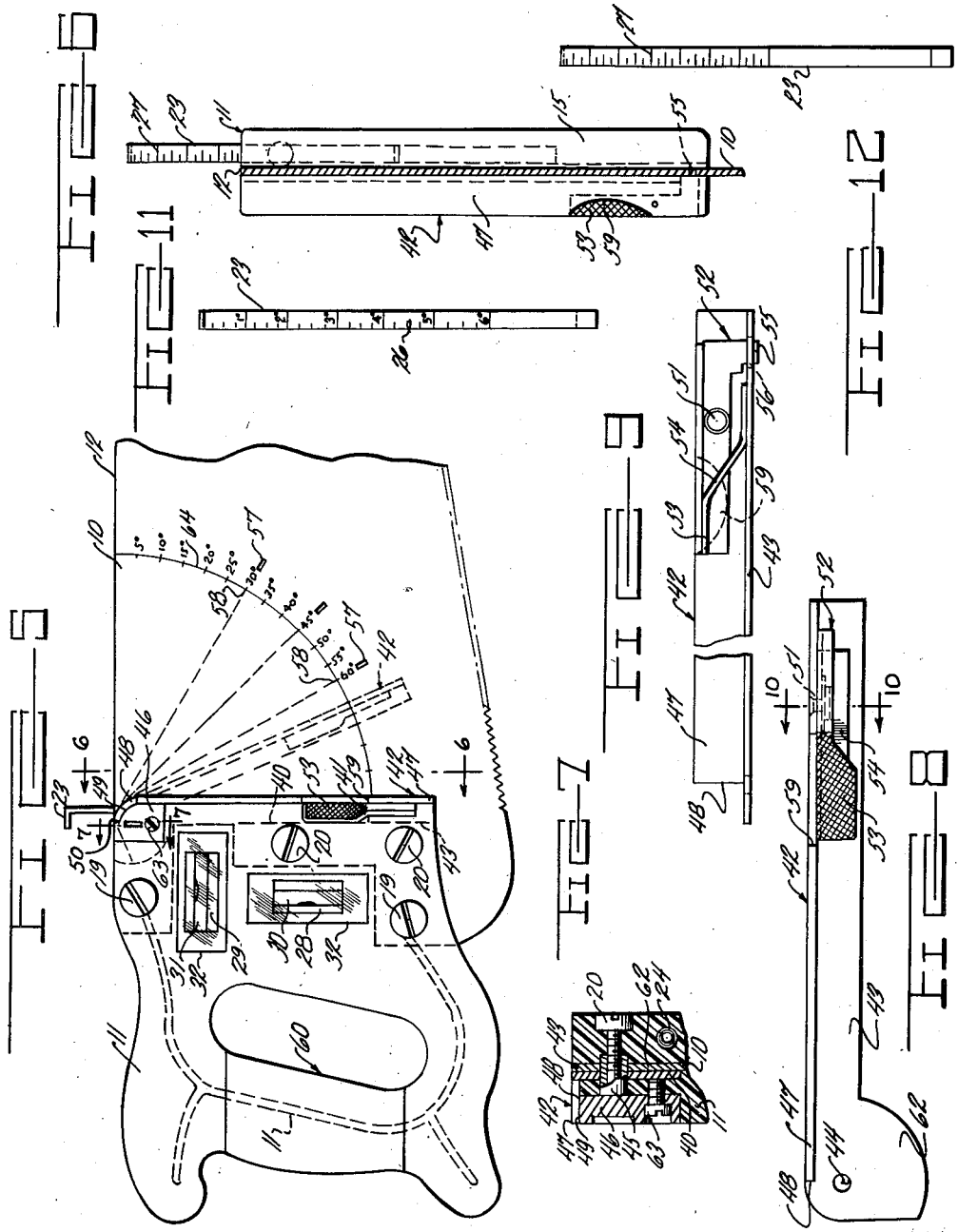
INVENTOR.
CHRIS AUCKLAND Patented July 8, 1952

2,602,240

UNITED STATES PATENT OFFICE 2,602,240

COMBINED HANDSAW AND GAUGE

Chris Auckland, West Englewood, N. J.

Application January 28, 1949, Serial No. 73,321

2 Claims. (Cl. 33—213)

My invention relates to a combined hand saw and gauge, and more particularly to hand saws of the type having a straight back edge and means operatively associated with the handle of the saw to provide with the straight back edge of the saw a square.

With the foregoing in view, it is an object of my invention to provide an improved combined hand saw and gauge of the class described.

A further object is to provide an improved hand saw and gauge of the class described wherein the means providing a square with the straight back edge of the saw blade is pivotally mounted, whereby the same may be disposed selectively in various angular relations to the straight back edge of the saw blade to provide a mitre gauge.

A further object is to provide in a combined hand saw and gauge of the class last mentioned, means for selectively locking the mitre gauge in selected angular relation to the straight back edge of the saw blade.

A further object is to provide an improved combined hand saw and gauge which includes a straight edge slidable in the saw handle to and from a retracted position and a projected position extending outwardly of the straight back edge of the blade at right angles thereto.

A further object is to provide in a combined hand saw and gauge such as that last described, means for measuring angles defined by the outer end of the straight edge and the free toe end of the straight back edge of the blade.

Other objects and advantages reside in the particular structure of the invention, combination and arrangement of the several parts thereof, and will be readily understood by those skilled in the art upon reference to the attached drawings in connection with the following specification, wherein the invention is shown, described and claimed.

In the drawings:

Figure 1 is an elevational view of the device of the invention, parts being broken away for clarity;

Figure 2 is a transverse vertical sectional view taken substantially on the planes of the lines 2—2 of Figure 1;

Figure 3 is a fragmentary longitudinal vertical sectional view taken substantially on the plane of the line 3—3 of Figure 1;

Figure 4 is a fragmentary longitudinal sectional view on a slightly larger scale and taken substantially on the plane of the line 4—4 of Figure 1;

Figure 5 is a fragmentary elevational view similar to Figure 1, but showing the opposite side of the saw;

Figure 6 is a transverse vertical sectional view taken substantially on the plane of the line 6—6 of Figure 5;

Figure 7 is a fragmentary transverse sectional view on a slightly enlarged scale and taken substantially on the plane of the line 7—7 of Figure 5;

Figure 8 is a plan view on a slightly enlarged scale of the mitre gauge apart from the rest of the structure;

Figure 9 is an elevational view of the gauge of Figure 8, parts being broken away;

Figure 10 is a transverse vertical sectional view on an enlarged scale and taken substantially on the plane of the line 10—10 of Figure 8;

Figure 11 is an elevational view of a level or plumb gauge and showing one side thereof;

Figure 12 is a view like Figure 11, but showing the opposite side of the level or plumb gauge.

Referring specifically to the drawings, wherein like reference characters have been used throughout the several views to designate like parts, the hand saw according to the invention includes a blade 10 and a handle 11. The blade 10 has a straight back edge 12 at least one surface of which is preferably calibrated, as at 13, with any suitable linear scale. The scale 13 extends from the free toe end 14 of the straight back edge 12 to a front edge 15 of one side of the handle 11. The front edge 15 of such side of the handle 11 intersects the straight back edge of the blade 10 at a right angle, whereby to provide therewith a square. Likewise, the portion of the surface of the blade 10 in front of the front edge 15 of the handle is preferably calibrated with any suitable linear scale 16.

The handle 11 is preferably molded of plastic with a reinforcement 17 molded therein. The handle and reinforcement 17 are of reversed U shape, whereby each spans the free ends of the legs of the other. The free ends of the legs of the reinforcement 17 are formed to provide washers or the like 18, Figure 2, through which pass the usual bolt or bolts 19 for connecting the blade 10 to the handle 11. The space between the free ends of the legs of the handle 11 is spanned by a wooden handle 60 which comprises a pair of sections 61 secured together in any suitable manner, as by being glued, whereby to complete the handle. The advantage of the wooden hand grip section 60 is that it provides a better grip and is readily replaced when worn. In this connection, it is noted that the forward end of the handle 11 is slotted to receive the butt end of the blade 10 therein in the usual manner. If desired, additional screws or bolts 20 may be utilized to assist the screws or bolts 19 in securing the handle to the blade. As best seen in Figure 4, the straight front edge 15 of the handle 11 comprises the outer surface of the web of a substantially U-shaped channel member 21 which overlies and underlies the front edge of the handle 11 at one side of the blade 10. Likewise, it should be noted that the web of the channel member 21 is slightly spaced from the front edge of the handle 11 to provide a slot or recess 22, Figure 3, which provides a channel or slideway for a rod or straight edge 23. As clearly seen in Fig. 1, the straight edge 23 has a foot at its outer end and may be advanced from a retracted position to a position projecting beyond the straight back edge 12 of the blade 10 at right angles thereto. Likewise, the adjacent portion of the handle 11 is provided with a recess 24 intersecting the channel 22 and mounting a pressure applying means or spring biased ball 25 which frictionally engages the straight edge 23 to retain the same in a selected advanced or retracted position. As best seen in Figures 11 and 12, one side of the straight edge 23 is calibrated with any suitable scale 26 for angular measurement, while the opposite side of the straight edge 23 is calibrated with any suitable scale 27 comprising a linear measurement. As best seen in Figure 1, when the straight edge 23 is in a selected projected position, and engaging a surface defined by a straight line 28, the free toe end 14 of the back edge 12 of the blade defines with such straight line 28 an angle. Thus, the calibrations 26 on the straight edge 23 enables the user of the device to read the measurement of such angle in degrees, or any other desired angular measurement.

The handle 11 is provided with a pair of transversely-extending recesses 28 and 29 which are disposed respectively at right angles to and parallel with the straight back edge 12 of the blade 10. It follows, of course, that the recess 28 is parallel to the straight front edge 15 of the handle 10, while the recess 29 is at right angles to such edge 15. The recess 28 has mounted therein a spirit level 30, while the recess 29 has a spirit level 31 therein. The recesses 28 and 29 are covered on both sides by sheets 32 of clear plastic to provide a clear view of the levels and protect them against breakage or the influx of dust or moisture. The spirit levels 31 and 30 have their ends seated in any suitable plastic bases 33 which may be removable with the spirit levels as units from the recesses 28 and 29 to permit replacement of the levels and/or adjustment of the same. Obviously, the spirit levels 30 and 31 cooperate with the straight edge 23 to indicate the degree and/or linear amount that the surface 28 is out of level or out of plumb with the straight back edge 12 of the blade 10. It is only necessary to project the straight edge 23 against the surface 28 until one or the other of the spirit levels indicates zero, at which time the reading on the calibrations 26 or 27 of the straight edge 23 may be made in a well known manner.

The device of the invention also includes a mitre gauge which is best seen in Figures 5 to 9, inclusive, and which is mounted on the front portion of the handle 11 on the opposite side of the blade 10 with respect to the straight edge 23. For this purpose, such forward edge of the handle 11 is formed with an undercut providing an elongated recess 40 overlying the adjacent surface of the blade 10. Likewise, such front edge of the handle 11 is cut away to provide a recess 41 for a purpose to be apparent hereinafter. The mitre gauge 42 is best seen in Figures 5, 8 and 9, and is elongated of angular cross-section including a flange 43 which is parallel with the blade 10 and slidable thereon. The flange 43 is shaped to fit into the elongated recess 40 formed in the handle 11 when the gauge is in the retracted position shown in full lines in Figure 5. The upper end of the flange 43 is enlarged rearwardly, as at 62, and is formed with a circular aperture 44 therethrough for pivotally receiving the shank 45 of a pivot-providing bolt having a non-circular head 46. A set screw 63 is threaded through bolt head 46 for engagement with the enlargement 62 of flange 43 of gauge 42 whereby to hold the same in adjusted positions. The gauge 42 also includes a flange 47 which extends at right angles to the adjacent surface of the blade 10 and also at right angles to the straight back edge 12 of such blade. That is to say, the flange 47 extends at right angles to the straight back edge 12 of the blade when the mitre gauge 42 is in the retracted position shown in full lines of Figure 5. As clearly seen in Figures 8 and 5, the flange 47 is cut away at the upper end thereof to provide an end edge 48. Likewise, it is noted that the non-circular head 46 of the bolt 45 is provided with an arcuate groove 49 concentric to the shank 45. The groove 49 terminates in a shoulder 50 which is substantially at right angles to the straight back edge 12 of the blade. As clearly seen in Figure 5, when the mitre gauge 42 is swung on the pivot 45 in a counter-clockwise direction to the broken line position, the end edge 48 of the flange 47 rides in the groove 49. Obviously, when the flange 47 reaches a point at which it is aligned laterally with the straight back edge 12 of the blade, the end edge 48 will abut the shoulder 50 and prevent further pivotal movement of the mitre gauge in a counter-clockwise direction. This arrangement is desirable to prevent the swinging of the mitre gauge 42 beyond the straight back edge 12 of the blade, whereby it would be likely to be caught upon objects and damaged. Adjacent the opposite end of the flange 47, there is provided a pivot 51 which is substantially parallel to the adjacent surface of the blade 10. Such pivot 51 pivotally mounts a latch 52 for pivotal movement parallel to the flange 47. The upper end of the latch 52 is provided with a laterally-directed thumb piece 53, the upper surface of which may be knurled. A leaf spring 54 has its upper end fixed to the thumb piece 53 and its lower end riding on the flange 43, whereby to load the latch 52 for pivotal movement on the pivot 51 in a clockwise direction, as viewed in Figure 9. This movement urges a latch dog 55 formed on the front end of the latch 52 toward the blade 10. In this connection, it should be noted that the flange 43 is formed with an aperture 56 through which the dog 55 passes. Also, it should be noted that the blade 10 is provided with an arcuate series of latch detents 57 which comprise recesses, or as illustrated, holes through the blade. Also, it is understood that there is a recess 57 immediately below the latch dog 55 when the mitre gauge 42 is in the retracted position, whereby to lock the same in such position. The remaining apertures or recesses 57 may be designated by suitable indicia 58, Figure 5, indicating the number of degrees of angularity of the mitre gauge 42 relative to the straight back edge 12 of the blade 10. To facilitate the actuation of the thumb piece 53, the upper edge of the flange 47 may be provided with an arcuate recess 59 which facilitates the depression of the thumb piece 53.

Preferably, the indicia 58 and the recesses 57 designated thereby are located to cause gauge 42 to define frequently-used angles, as 30°, 45° and 60°. Thus, the gauge may be quickly set to these angles upon loosening of set screw 63 and by using latch 52 to lock the gauge. However, I prefer to have also an arcuate protractor scale 64 on blade 10 of which the indicia 58 are a part. To set the gauge 42 at a setting on scale 64 intermediate recesses 57, the set screw 63 must be tightened, of course.

While I have shown and described what is now thought to be the preferred embodiments of my invention, it is to be understood that the same is susceptible of other forms and expressions. Consequently, I do not limit myself to the precise structures shown and described hereinabove except as hereinafter claimed.

I claim:
1. The combination with a blade having a straight back edge, a handle having one end arranged in end to end facing relation with respect to one end of said blade, said one end of said handle embracing said one end of said blade and secured to the latter, means in said handle for visually determining whether a surface to be leveled is truly horizontal or vertical, of a pitch determining fixture operatively connected to said handle, said fixture comprising a rod having one end adapted to engage a surface to be levelled positioned transversely of said straight back edge of said blade and of said handle inwardly of and adjacent said one end of said handle and mounted in said handle for movement from an extensile position in which said one end is engageable with the surface to be levelled and coactable with said means to a contractile position within said handle, and a pressure applying means carried by said handle and engageable with said rod intermediate its ends for holding said rod in any one of the extensile and contractile positions.

2. The combination with a blade having a straight back edge, a handle having one end arranged in end to end facing relation with respect to one end of said blade, said one end of said handle embracing said one end of said blade and secured to the latter, means in said handle for visually determining whether a surface to be leveled is truly horizontal or vertical, of a pitch determining fixture operatively connected to said handle, said fixture comprising a rod having one end provided with a foot adapted to engage a surface to be levelled positioned transversely of said straight back edge of said blade and of said handle inwardly of and adjacent said one end of said handle and mounted in said handle for movement from an extensile position in which said foot is engageable with the surface to be levelled and coactable with said means to a contractile position within said handle, and a sping biased ball positioned in said handle and engageable with said rod for holding said rod in any one of the extensile and contractile positions.

CHRIS AUCKLAND.

REFERENCES CITED

The following references are of record in the file of this patent:

UNITED STATES PATENTS

| Number | Name | Date |
| --- | --- | --- |
| 948,059 | Larson et al. | Feb. 1, 1910 |
| 1,102,293 | Pedersen | July 7, 1914 |
| 1,217,286 | Dewees | Feb. 27, 1917 |
| 1,277,433 | Larson | Sept. 3, 1918 |
| 1,338,188 | Mendel | Apr. 27, 1920 |
| 1,641,831 | Shearer | Sept. 6, 1927 |
| 1,701,069 | Frantz | Feb. 5, 1929 |
| 2,520,700 | Thorndike | Aug. 29, 1950 |